US010821649B2

(12) United States Patent
Meyer et al.

(10) Patent No.: US 10,821,649 B2
(45) Date of Patent: Nov. 3, 2020

(54) DEVICE AND METHOD FOR THERMALLY CONDITIONING PREFORMS

(71) Applicant: KHS CORPOPLAST GmbH, Hamburg (DE)

(72) Inventors: Niels Meyer, Schenefeld (DE); Deniz Ulutürk, Hamburg (DE); Frank Lewin, Tangstedt (DE)

(73) Assignee: KHS Corpoplast GmbH, Hamburg (DE)

( * ) Notice: Subject to any disclaimer, the term of this patent is extended or adjusted under 35 U.S.C. 154(b) by 94 days.

(21) Appl. No.: 16/095,413

(22) PCT Filed: Apr. 27, 2017

(86) PCT No.: PCT/EP2017/060120
§ 371 (c)(1),
(2) Date: Oct. 22, 2018

(87) PCT Pub. No.: WO2017/186875
PCT Pub. Date: Nov. 2, 2017

(65) Prior Publication Data
US 2019/0134878 A1 May 9, 2019

(30) Foreign Application Priority Data

Apr. 29, 2016 (DE) ........................ 10 2016 005 273

(51) Int. Cl.
*B29C 49/64* (2006.01)
*B29C 49/68* (2006.01)
(Continued)

(52) U.S. Cl.
CPC .......... *B29C 49/6418* (2013.01); *B29C 49/68* (2013.01); *B29K 2067/003* (2013.01); *B29L 2031/7158* (2013.01)

(58) Field of Classification Search
CPC ............ B29C 49/4205; B29C 49/4215; B29C 2049/4226; B29C 49/6409; B29C 49/6418; B29C 49/68
See application file for complete search history.

(56) References Cited

U.S. PATENT DOCUMENTS 2,844,699 A 7/1958 Miskella
3,157,775 A 11/1964 Harmon
(Continued)

FOREIGN PATENT DOCUMENTS

CN 105339158 A 2/2016
DE 2427611 A1 12/1975
(Continued)

OTHER PUBLICATIONS

Partial machine translation of FR2890801A1 dated Mar. 2007 obtained from the espace website. (Year: 2007).*

*Primary Examiner* — Robert B Davis
(74) *Attorney, Agent, or Firm* — Rankin, Hill & Clark LLP

(57) ABSTRACT

The invention relates to a heat box for thermally conditioning preforms (10) that consist of a thermoplastic material and are provided for blow moulding, in which two lateral walls (32) and one base wall (34) delimit a heat tunnel through which the preforms (10) are conveyed, said heat tunnel comprising at least two parallel heat channels, and a heating unit (14) being arranged between two adjacent, particularly parallel heat channels and comprising a plurality of rod-shaped heating elements (16) that extend longitudinally in the conveyor direction of the preforms (10).

15 Claims, 4 Drawing Sheets

Figure 1:
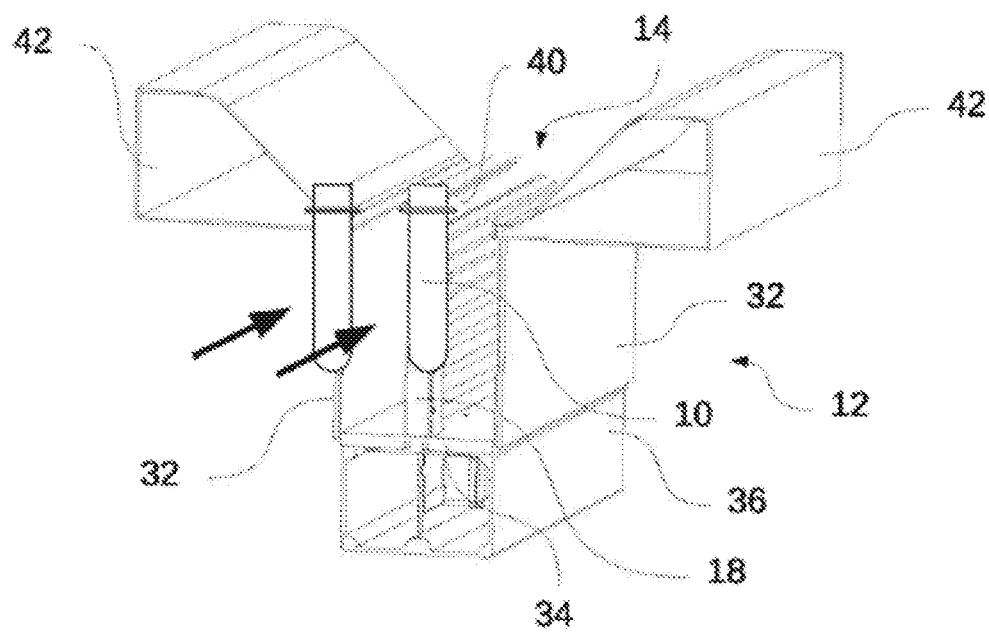

(51) Int. Cl.
*B29L 31/00* (2006.01)
*B29K 67/00* (2006.01)

(56) References Cited

U.S. PATENT DOCUMENTS

| | | | | |
|---|---|---|---|---|
| 3,995,990 | A * | 12/1976 | Dwyer | B29C 49/4205 |
| | | | | 432/121 |
| 4,204,111 | A | 5/1980 | Yonko | |
| 6,005,223 | A * | 12/1999 | Ogihara | B29C 49/68 |
| | | | | 219/388 |
| 6,241,939 | B1 | 6/2001 | Takada et al. | |
| 2014/0120203 | A1 * | 5/2014 | Zacche' | B29C 49/68 |
| | | | | 425/526 |
| 2016/0167258 | A1 | 6/2016 | Heuzebroc et al. | |
| 2016/0368197 | A1 | 12/2016 | Takahashi et al. | |

FOREIGN PATENT DOCUMENTS

| | | | |
|---|---|---|---|
| FR | 2890891 A1 * | 3/2007 | ............. B29C 49/68 |
| JP | S5468872 A | 6/1979 | |
| WO | 0162463 A1 | 8/2001 | |
| WO | 2014208693 A1 | 12/2014 | |
| WO | 2015000875 A1 | 1/2015 | |

\* cited by examiner

DEVICE AND METHOD FOR THERMALLY CONDITIONING PREFORMS

The invention relates to a heat box for the thermal conditioning of preforms made of thermoplastic material that are provided for blow molding and to a heating device including several of such heat boxes, to a blowing machine with a heat box, and to a method for forming a temperature profile in wall material of preforms made of thermoplastic material that are provided for blow molding.

In the molding by the action of blowing, pressure preforms of a thermoplastic material, for example of PET (polyethylene terephthalate) are supplied in the area of a blowing machine to different workstations. Typically, such a blowing machine comprises a transport device for supplying preforms to the blowing machine, a heating device for the thermal conditioning of the preforms and a blowing station with a blowing device in whose area the tempered preforms are expanded by biaxial expansion to a container. The expansion takes place with the aid of fluid, in particular a gas, standing under pressure which is introduced into the preform to be expanded. The preforms are preheated to a suitable base temperature in the heating device set in front of the blowing station in order to prepare the material for the stretch blow molding. Moreover, the preforms are provided with a suitable temperature profile in order to purposefully influence flow properties of the material in areas during the stretch blow molding.

It turned out in the development history of heating devices for the thermal conditioning of preforms that sharply delimited temperature profiles, that is, areas of different temperatures in the wall material of the preforms can be especially well obtained by the use of directed thermal radiation in open radiation areas. Thermal radiation in open areas is not reflected from limiting wall areas and therefore does not lead to a blurring of the temperature boundaries between areas of different heating. On the other hand, the use of closed radiation areas leads to significant savings of energy during the heating of preforms since reflected thermal radiation can also be used for the base tempering of preforms and therefore little radiation energy is lost and not used. Radiation areas therefore adversely affect the sharp profiling of preforms on the one hand but improve the energy balance by the increase of efficiency on the other hand which is produced by the using of reflected radiation.

The heating device is typically constructed as a linear furnace, wherein the preforms are guided for the tempering through a heating stretch formed with a series of heat boxes. In order to transport the preforms along the heating stretch of the heating device, the preforms are typically held upright on transport pegs with the mouth facing upward and moved guided in a forced manner through heat channels of the heat boxes.

The transport pegs are typically put in rotation in the area of the heat boxes, for example, in that the transport peg is moved past a toothed belt in such a manner that a toothed disk fastened on the transport peg engages into the toothed belt and is necessarily rotated. The preforms can be uniformly tempered by such a rotation. If necessary, the rotation can be stopped in stretches in order, for example, to imprint a certain profile pattern.

Usually, near-infrared radiators (NIR) are provided inside the heat boxes for generating a thermal radiation. The use of infrared radiators (IR) is also known. A typical heat box furthermore comprises reflection structures which reflect thermal radiation in order to make possible a suitable distribution of the thermal radiation inside the heat box.

It is known from the prior art that the thermal radiators can be designed as substantially rod-shaped halogen radiators. In known heat boxes the radiators are typically fastened parallel above each other to a vertical side of the heat box so that the preform can be guided in a heat channel of the heat box between the radiators and a side wall opposite the radiators. The temperature profiling of the preforms along their longitudinal axis takes place here, among other things, by different power settings of the superposed radiator units.

Reflectors reflecting the thermal radiation can be arranged behind the radiators, at times also in the bottom area of the heat box and at times also on the side of the heat box located opposite the radiator plane, which reflectors ensure an effective and/or a desired distribution of the thermal radiation inside the heat box. Such reflectors can be manufactured from metal, for example, a sheet, or from ceramic materials or other materials. Depending on the application, the reflectors are designed with different geometries. For example, an aluminum profile can be provided behind the radiators which is constructed in the shape of a W. It turned out when such W profiles are used that the material of the reflector is excessively strongly heated, for which reason at times an active cooling of the profile must be provided from the back side. This active cooling is typically generated by an air flow by a ventilator arranged under the heating tunnel. At the same time, a cooling of the electrical connections of the radiator tubes is achieved with this air current. The radiator tubes are typically bent at their free ends at an approximately 90° angle and project with their end areas into the reflector profile. The thermal amount to be removed constitutes a significant loss factor in the energy balance of the heat box.

A problem of the present invention is to make available a device and a method for the thermal conditioning of preforms which improve the formation of a temperature profile in the wall material of the preforms.

The problem is solved by a heat box as disclosed and claimed herein, by a heating device as disclosed and claimed herein, by a blowing machine as disclosed and claimed herein and a method as disclosed and claimed herein.

According to the invention a heat box is provided for the thermal conditioning of preforms of thermoplastic material provided for the blow molding and in which two side walls and a bottom wall limit a heating tunnel for the through transporting of the preforms, wherein the heating tunnel comprises at least two heat channels running parallel to one another and wherein a heating unit with several rod-shaped heating elements aligned longitudinally in the transport direction of the preforms is arranged between two heat channels which are adjacent to one another and in particular run parallel to one another.

The heat channel forms in particular a common radiation area comprising both heat channels. This makes it possible that two heat channels running adjacent to one another are simultaneously supplied with thermal radiation by a single heating unit arranged between the two adjacent heating channels. In heat boxes with a traditional construction each channel is provided with its own heating unit which stands on its first side in direct visual contact with the preforms transported in the heat channel and radiates against a radiation reflector on its opposite side. In contrast thereto, in the construction according to the invention the heating unit separating two adjacent heat channels stands on both sides in direct visual contact with the preforms transported in the heat channels so that, therefore, two heat channels can be simultaneously comprehended by a single heat unit heating preforms on both sides. Therefore, the heating elements of a heating unit which radiate into a first heat channel can also emit heat radiation into the adjacent second heat channel.

As various tests have shown, especially good results for the forming of a suitable temperature profile can be achieved in the heating of preforms moved past two sides of the heating unit if the heating unit comprises at least one web-shaped radiation shield which is arranged in a longitudinal extension to the heating elements between two adjacent heating elements.

The web-shaped radiation shield is positioned longitudinally between two superposed heating elements. A part of the primary radiation emitted by the heating elements is screened here. Such radiation shields prevent at first an undesired radiating of heating radiation into the adjacent heating element. In this manner the adjacent heating elements can be protected from overheating. Also, in this manner the distance between two adjacent heating elements can be reduced, which also makes it possible to house a greater number of heating elements and/or to use more powerful heating elements in the heating unit.

Moreover, radiation can be screened with the web-shaped radiation shields which would meet the preform in a direction unfavorable for forming the temperature profile. In particular, an undesired overlapping of radiation of a heating element with radiation from one or more of the remaining heating elements can be reduced in this manner.

The web-shaped radiation shield is preferably designed at least in sections with a rectangular or oval cross section. When using a rectangular cross section the radiation shield can be designed like a flat rod, that is, in particular as a longitudinally extended, web-shaped body with two plane flat surfaces running parallel to one another whose vertical distance is less than the transverse extension of the body in a flat surface plane transverse to its longitudinal direction.

Various materials or body shapes can be considered as radiation shield. In one variant the web-shaped radiation shield is a body consisting of a solid material.

Another variant considered building up the body of the radiation shield in several layers. For example, a layered construction with at least one layer of quartz glass and at least one other shield material layer is conceivable. The layer of shield material preferably contains a material which has a high coefficient of reflection in particular in the wavelength range of infrared radiation (IR) or near-infrared radiation (NIR).

In particular, the radiation shield can be a quartz glass tube filled with a filling material.

In order to produce a radiation field according to the invention, it was considered that a quartz glass tube is molded in an oval or rectangular mold and subsequently filled with a material which reflects in particular in the wavelength range of infrared radiation (IR) or near-infrared radiation (NIR). It is conceivable to fill the filling material in a solid, powdery or liquid form into the quartz glass tube. Finally, the filling opening is closed.

An alternative embodiment considers that a quartz glass tube is first filled with a material which reflects, as mentioned, in the wavelength range of infrared radiation (IR) or near-infrared radiation (NIR and subsequently is formed in an oval or rectangular mold.

The filling material can preferably be a metal oxide powder such as, for example, a titanium oxide or an oxide ceramic powder. The using of a silicon dioxide powder is conceivable.

It proved to be especially advantageous if the filling material has an especially low absorption capacity for the thermal radiation emitted by the heating elements. Therefore, the filling material should preferably have a low thermal capacity.

The radiation shield manufactured from a quartz glass tube filled with a filling material can also be used in other usages not explained here. Such a radiation shield and embodiments and manufacturing methods explained for it can be independent, inventive subject matter, in particular in combination with a heating unit—like, for example, the one described here—comprising several superposed, rod-shaped heating elements.

An embodiment provides that the heating units comprise two column-like carrier elements for holding the heating elements, wherein each of the carrier elements has a passage on each of its free ends which are opposed in the longitudinal direction, which passage open a conduit-like longitudinal shaft of the carrier elements in such a manner that a fluid flow is rendered possible through the longitudinal shaft of the carrier elements.

In particular, a passage in a heat box is understood as a heat channel through which preforms can be transported.

In order to cool heat-sensitive areas of the heating elements, it can be provided that each of the rod-shaped heating elements is held at its end areas, which are opposite in the longitudinal direction, on the carrier elements in such a manner that the free ends of the heating elements project into the longitudinal shafts of the carrier elements.

A preferred embodiment considers that a gaseous cooling fluid flows through the longitudinal shaft for cooling the elements arranged or projecting into the longitudinal shaft such as the electrical connections of the heating elements preferably constructed as steel pipes, the end areas of the heating elements and/or other components. It is also conceivable that a liquid cooling fluid flows through the longitudinal shaft. Accordingly it was considered to design the longitudinal shafts to be gas-tight and/or liquid-tight. In particular, even gas-tight and/or liquid-tight sealing elements can be provided for sealing between the longitudinal shaft and the heating element.

A preferred variant of an embodiment provides that the heat box is limited on two opposing sides and on the bottom by reflectors reflecting thermal radiation. Heating elements that are superposed in parallel above one another are arranged approximately centrally in a plane so that a separate transport channel results on both sides of the heating plane set by the heating elements. A series of preforms is guided through these transport channels.

In particular, it is provided that the heating elements are constructed as IR (infrared) or as NIR (near-infrared) radiators. The heating elements can be advantageously designed to be straight and rod-shaped, wherein the straight end areas of the heating elements are held in the carrier elements of the heating unit. The carrier elements preferably comprise highly-reflective surfaces for thermal radiation.

According to the invention these carrier elements comprise a longitudinal shaft and are open at the top and the bottom so that a chimney effect is produced in the longitudinal shaft which allows a desired cooling for the electrical connections of the heating elements with an especially low usage of cooling agent. This prevents appreciable amounts of a cooling air from entering into the heating area or into the heating channels of the heat box. In order to support the chimney effect, it can be provided that the cooling air is forcibly guided through the carrier elements, for example under the generation of a pressure gradient between the openings of the carrier elements.

In order to further improve the temperature profiling of the preforms guided past the heating unit, it can be provided that reflected screening surfaces or screening sheets are arranged between the superposed heating elements. Alternatively or additionally, reflecting coatings which reflect thermal radiation can be provided on the heating elements and which allow a desired distribution of the thermal radiation in the heat channel.

It can be provided that the preforms are guided through the adjacently located heat channels in opposite directions or in the same direction. Details of preferred variants of embodiments are explained in the following.

In a construction of a double-channel for two preforms which are guided adjacent to one another and are separated by a heating unit, almost the entire primary radiation of the heating elements first strikes preforms and not—as in known heating devices—where at first substantially one half strikes a reflector on the back side. This places significantly more energy in the form of heat on the preforms particularly in comparison to reflectors with low or poor reflection properties.

Furthermore, the loading density in the heating stretch can be distinctly increased. In any case, double as many preforms can be guided in the heat boxes according to the invention than in a heat box with laterally arranged heating elements. This improves the ratio of material to be heated to a reflector surface with losses and it therefore improves the amount of total radiation energy which is put on a desired position in the preforms.

It is also advantageous that the heat channel of the heat box according to the invention can be provided with exclusively level reflector surfaces. In the case of the heat boxes according to the invention with a double channel the customarily used W profile can be eliminated. Level reflector surfaces can be especially simple and economical to manufacture.

It can be provided for the connection of the heating units to a current source and/or to a control unit of the heat box that each of the rod-shaped heating elements of a heating unit is electrically connected to a common plug contact of the heating unit in its position of use held on the carrier elements.

It was considered that the heating elements are designed as thermal radiators, in particular as IR/NIR radiators. Such radiators are typically designed as glass bulbs with an internal spiral-wound filament. The free ends of the glass bulb are closed in order to avoid the entry or exit of gas, wherein electrical contacts arranged in the closure area are contacted by the internal spiral-wound filament in order to load the spiral-round filament with current from outside of the glass bulb. The contact elements are constructed, for example, from molybdenum. The contact elements are typically connected for the current supply by electrical conductors or cables to a control circuit. The current supply of the heating elements can preferably be adjusted by a control device. The electrical conductors or cables are preferably connected to the contact elements in a firmly bonded manner. Holding elements can be provided on the carrier elements on their free ends for protecting the free ends of the heating elements and/or for the positive holding of the heating elements. These holding elements can be manufactured, for example, from a ceramic material or from another heat-resistant material.

A simple assembly or disassembly of the heating unit in a heat box is supported by the contacting of the heating elements of the heating unit on a common plug contact. In particular, it is provided that the individual heating elements of the heating unit can be separately loaded with a current via the common plug contact. In order to adjust a desired heating profile, the individual heating elements can therefore be controlled via a central station and/or via a decentralized control device.

It can be provided in a preferred embodiment that the heating units are constructed in a modular manner so that they can be removed from the heat box for replacement or for maintenance and/or assembly work. In particular, readily accessible fastening means can be provided for the modular construction of the heating units and which ensure a secure holding of the heating unit in the heat box and at the same time allow a simple loosening or fastening in the heat box. A variant considers that the heating units comprise a bottom element which forms a bottom area of the heat box when inserted into the heat box. It was considered with preference that the bottom element of the heating unit is manufactured from a material reflecting thermal radiation but in any case is designed to dampen heat.

It can be provided for the simple replacement of heating elements and/or for simplifying assembly work and/or maintenance work that the carrier elements each comprise a removable cover element with which a lateral access to the longitudinal shaft can be freed. For example, the replacement of defective heating elements can be simplified by using a removable cover element.

It is preferably provided for a secure holding of the heating elements on the carrier elements that the heating elements comprise holding bodies in their end areas which can be positively inserted into receiving openings of the carrier elements. It can be provided, for example, for a positive holding of the heating elements on the carrier elements that the holding bodies comprise guide splines which run with a good fit in guide grooves on the receiving openings.

It can be provided for a simple assembly and replacement of the heating elements that the receiving openings are worked in like combs as laterally open slide-in units into a wall area of the carrier element. The lateral slide-in units are especially preferred in the case of carrier elements with cover elements. The cover element can be arranged on the carrier element in such a manner that the slide-in units are covered in the closed position. In the open position the heating elements can be readily removed for maintenance or replacement.

It was considered for a flexible ability to adjust the distribution of heat inside the heat boxes that the wall areas with the receiving openings are supported in a longitudinally shiftable manner on the carrier elements at least on the carrier elements of a few of the heating elements. The ability to shift the wall areas with the receiving openings longitudinally has the advantageous effect that the heating elements can be adjusted in height in the heating units. The possibility of a height adjustment makes it readily possible to adjust or adapt a desired heating profile. In addition, the wall areas with the receiving openings can be replaced in an especially simple manner without the carrier elements having to be removed as an entire unit from the heating units. Therefore, for example, wall areas with differently spaced receiving openings can be provided in order to adapt the heating profile of the heating box as needed with a certain spacing of the heating elements.

In order to generate an advantageous distribution of heat and to increase the degree of efficiency of the heating process, it can be provided that two opposing side walls of the heat box with the two heating channels running parallel to one another comprise elements which reflect thermal radiation. They can preferably be level reflector surfaces. Alternatively or additionally, curved reflector surfaces can be provided. Even the bottom area limited by the side walls can have such reflector surfaces. The side walls and/or the bottom area are preferably designed completely or at least in areas as reflector surfaces.

In order to generate an air flow through the longitudinal shafts of the carrier elements, it was considered that a cooling conduit is arranged underneath the heat box and which is connected in a communicating manner with the longitudinal shafts of the carrier elements. It was especially considered that in the case of a series of several adjacent heat boxes for forming a heating stretch, a common cooling conduit is provided under the heat boxes. The carrier elements can be supplied in a simple and efficient manner with cooling air by a common cooling conduit below the heat boxes. The cooling air in the cooling conduit can be loaded with pressure in order to support the chimney effect in the carrier elements. It is conceivable as an alternative to a common cooling conduit that the carrier elements with individual cooling conduits which are constructed separated from each other are supplied with cooling air.

It was considered for the transport of the preforms through a heating device with hot boxes according to the invention that the heating device comprises transport means with which the preforms can be moved in a first variant in a single row S through the heat boxes in such a manner that the preforms are forcibly conducted in adjacently located heat channels of the heat boxes in opposing directions. Such transport means can comprise, for example, the carrier pegs customarily used in heating devices of this type. It was considered in a second variant that the preforms are guided in two heat channels located adjacent to one another in the same transport direction through the heat boxes. A preferred embodiment provides that the preforms are transported suspended on transport pegs through the heat channels of the heat boxes.

According to the invention a heating device is also provided with several heat boxes arranged adjacent to each other for forming a heating stretch in one of the previously cited methods and comprises a blowing machine with a heat box or a heating device according to one of the previous variants. In particular, it was considered that the heating device is used in a stretch blowing machine. Advantages and preferred embodiments of the blowing machine according to the invention also result from the details explained for the heating device according to the invention.

In addition, the invention comprises a method for forming a temperature profile in the wall material of preforms consisting of thermoplastic material provided for blow molding in which preforms are moved in adjacently guided transport rows through a heat box limited on at least three sides by wall elements, wherein the transport rows are guided through a heat channel of the heat box, and wherein a heating element is arranged between two adjacent heat channels and which heats the material of the preforms guided past it on both sides for forming the temperature profile.

It was considered in particular that a heat box is used in one of the previously cited variants for the thermal conditioning of the preforms. Other advantages and preferred embodiments of the method according to the invention also result from the details explaining the heat box according to the invention.

Figure 1A:
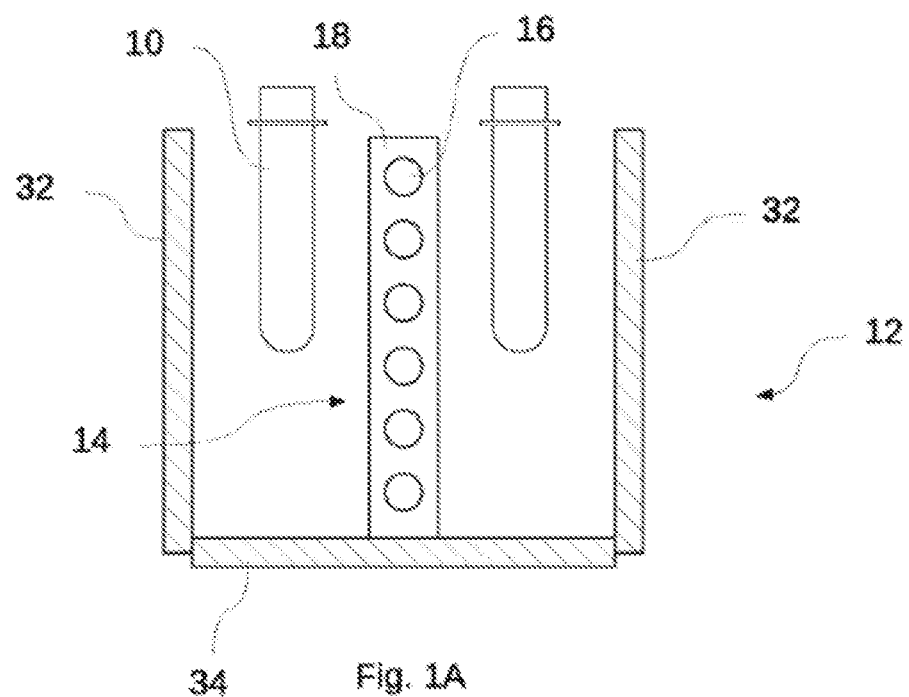
Figure 2:
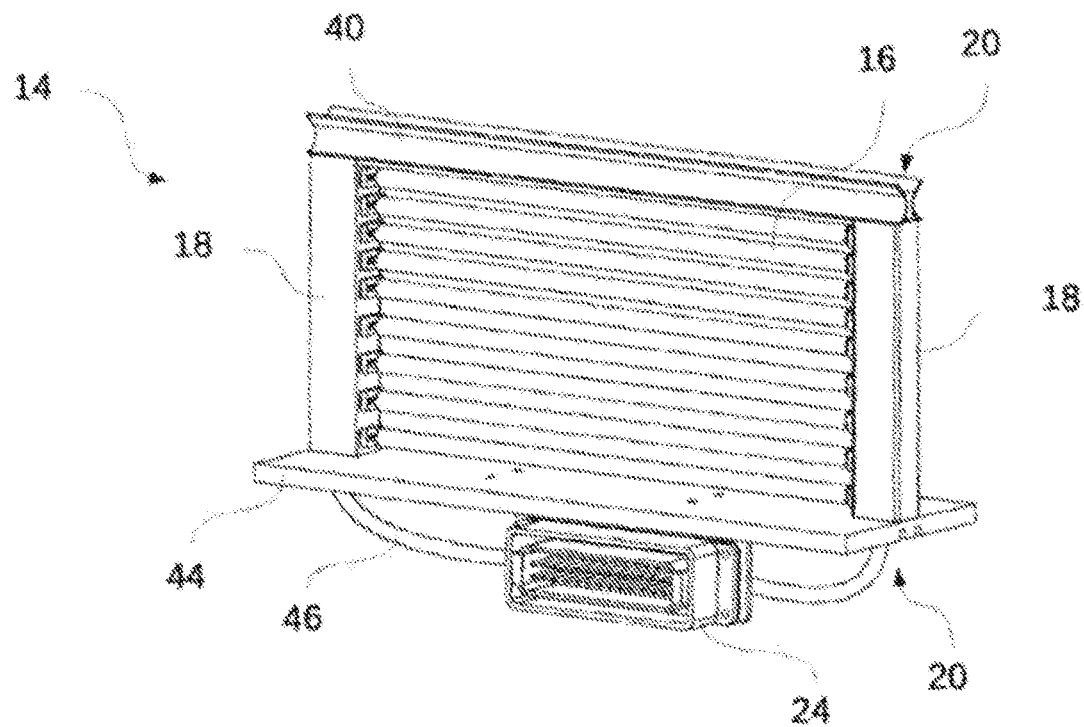
Figure 3:
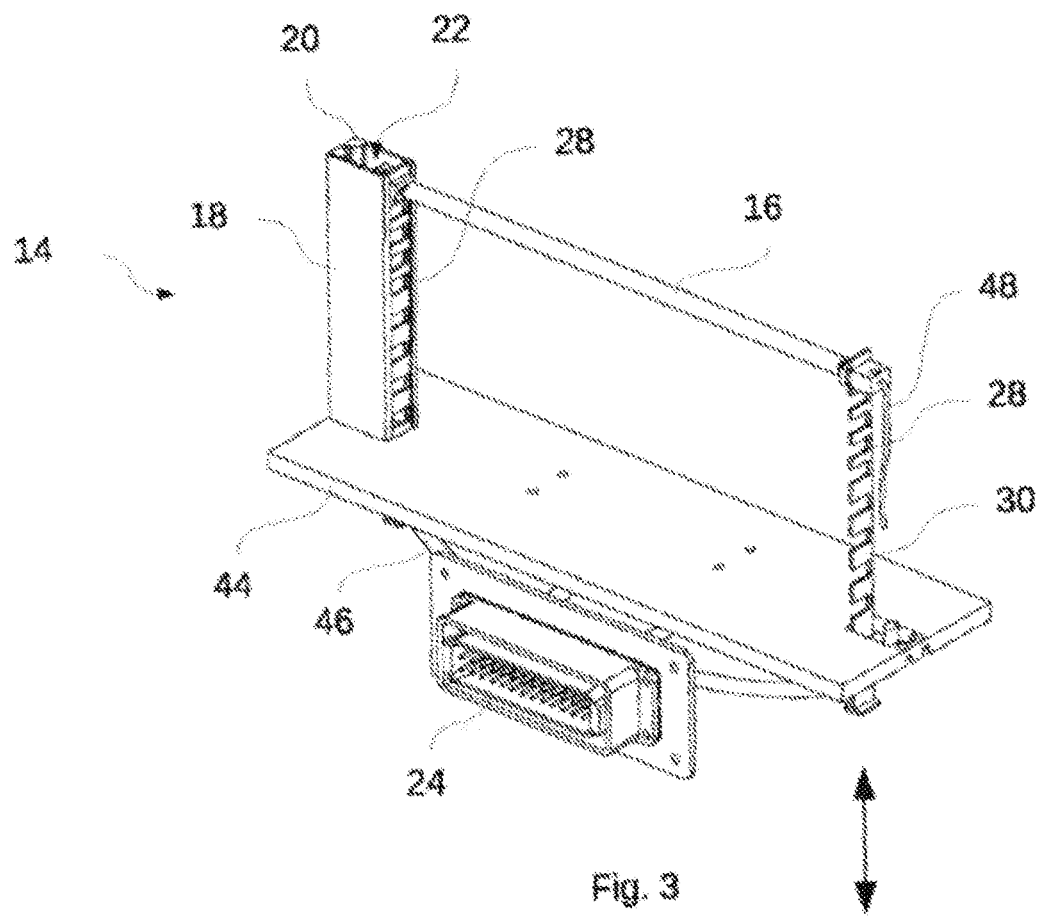
Figure 4:
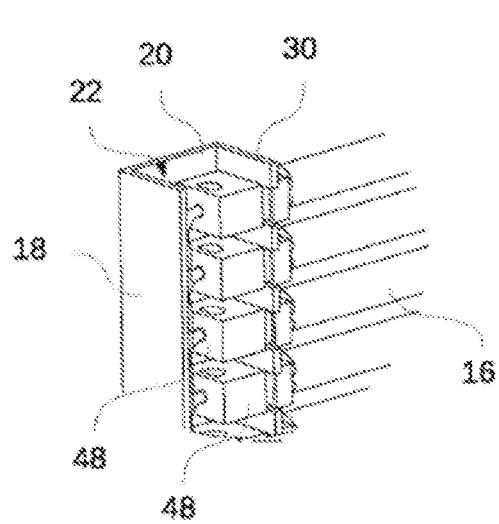
Figure 4:
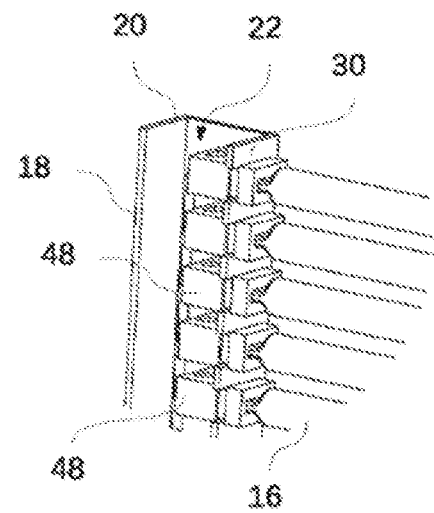
Figure 5:
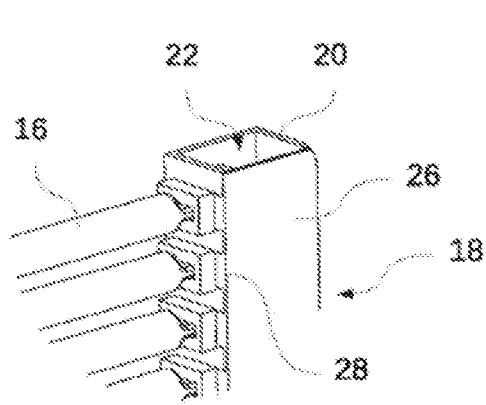
Figure 6:
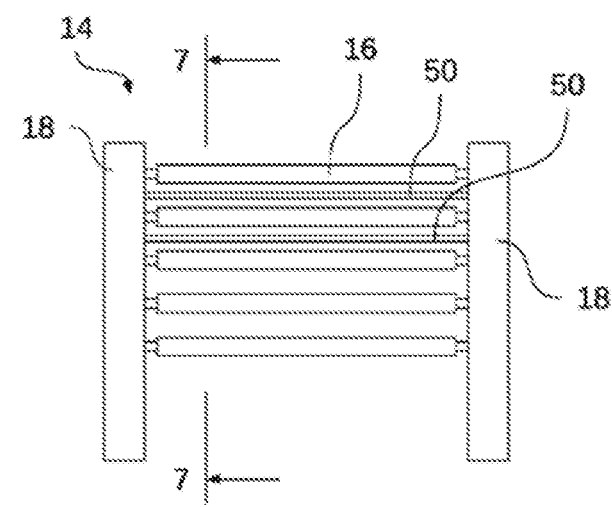
Figure 7:
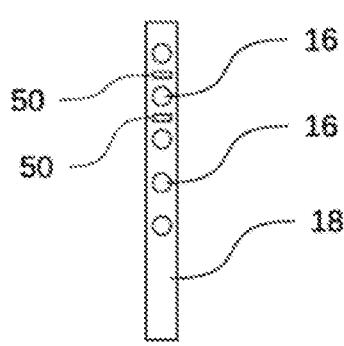
Figure 8:
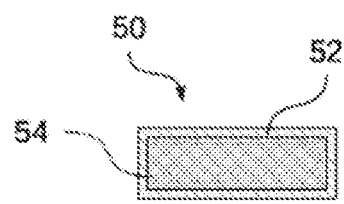
Figure 9:
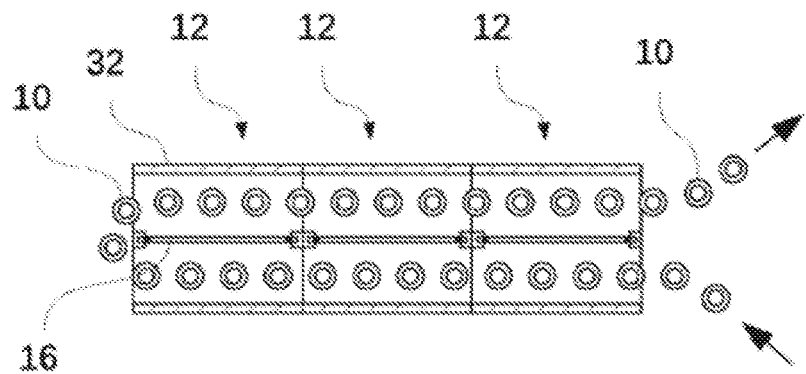
Figure 10A:
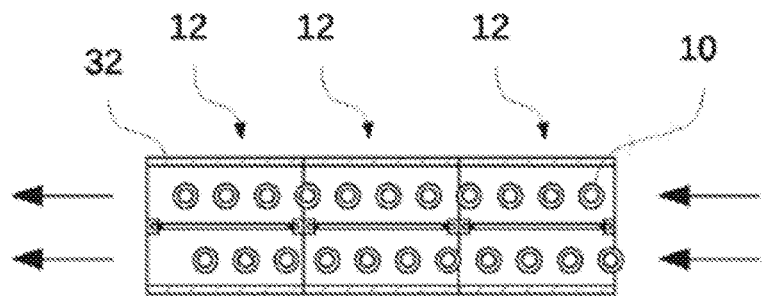
Figure 10B:
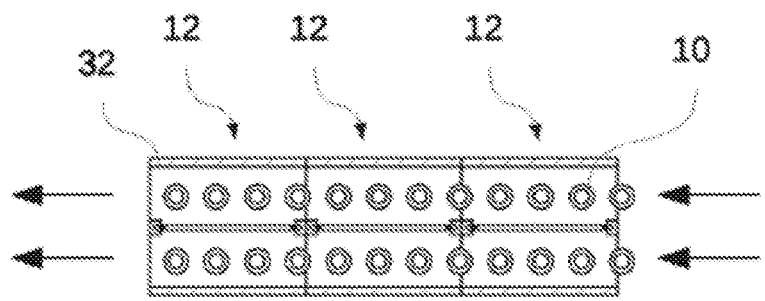
Figure 11:
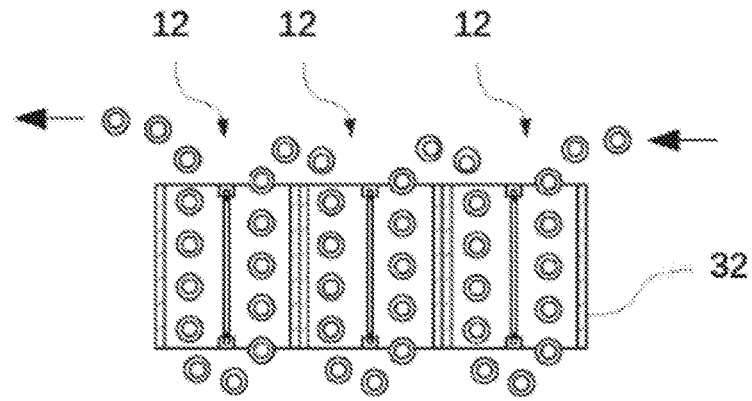

Exemplary embodiments of the invention are schematically shown in the drawings. In the drawings:

FIG. 1 shows a heat box according to the invention in a top, oblique perspective view, FIG. 1A shows a heat box according to the invention in a greatly schematized view looking along the provided transport direction, FIG. 2 shows a heat box according to the invention in a in a top, oblique perspective view, FIG. 3 shows a heat box according to the invention with exposed structural component units, FIG. 4 shows detailed views of carrier elements of heating units according to the invention with an open longitudinal shaft, FIG. 5 shows a detailed view of a carrier element with a closed longitudinal shaft, FIG. 6 shows a greatly schematized view of the heating unit according to the invention in a side view, FIG. 7 shows a sectional view of the heating unit in FIG. 6 along the intersection line 7-7, FIG. 8 shows a cross section through a web-shaped radiation shield according to the invention, FIG. 9 shows a heating stretch formed with the heat boxes according to the invention in a first variant in a schematic top view, FIG. 10A shows a heating stretch with heat boxes according to the invention in a second variant in a schematic top view, FIG. 10B shows a heating stretch with heat boxes in a modification of the second variant in a schematic top view, and FIG. 11 shows a heating stretch with heat boxes according to the invention in a third variant in a schematic top view.

FIG. 1 shows an isometric view of a heat box 12 according to the invention. The heat box 12 limits with two opposing side walls 32 and the bottom wall 34 two heat channels running parallel to one another for the through transporting of preforms 10. A heating unit 14 with heating elements 16 arranged longitudinally in the direction of transport of the preforms 10 is arranged approximately in the middle of the heat box between the heat channels. The preforms 10 are guided through the heat channels by transport means which are not shown. A through transporting of the preform 10 in the same direction as is sketched by the arrows in FIG. 1 is conceivable here in a first variant. In a second variant a through transporting of the preforms is made through adjacent heat channels in opposite directions.

A cooling conduit 36 is shown under the heat box 12 and which is connected in a communicating manner to carrier elements 18 of the heating unit 14. Upon a loading of the cooling conduit 12 with pressure, for example by a blower or the like, the cooling medium guided in the cooling conduit 36 flows into the carrier elements 18 of the heating unit 14 and escapes at the upper end of the carrier elements 18 into the environment of the heat box 12. A deflection sheet 40 is provided at the upper end of the heating unit 14 which sheet deflects the cooling air exiting out of the carrier elements 18 in a certain direction in order to avoid undesired mixing with other air masses. It can be provided, as shown, that other cooling conduits 42 are arranged in the transport direction of the preforms 10 on the side of the heat box 12 and which comprise an outlet which is like a slot, for example, at the level of the closure areas of the preforms 10. Upon the loading of these side cooling conduits 42 with pressure, a cooling air can exit from the slot-like outsets and serve to cool the closure areas of the preforms 10. The closure areas and/or orifice areas of the preforms 10 held during the transport through the heat channel in particular above an upper edge area of the heat box 12 can be readily recognized in the schematic view of the heat box 12 in FIG. 1a.

FIG. 1A shows a heat box 12 according to the invention in a heavily schematized view along the transport direction of the preforms 10. The heating unit 14 is indicated approximately in the middle with a carrier element 18 shown in the background and heating elements 16 indicated located in front in the drawing plane. For a basic understanding, in FIG. 1a—as also in part in other figures—only selected components of the claimed invention are shown. It can be recognized here that the preforms 10 are transported at a distance from the bottom 34 and the transport paths of the heat box 12. In particular, it is provided that the preforms 10 are guided past the heating units 14 with their orifice area facing vertically upward, in particular in such a manner that the orifice areas are held by a neck ring arranged underneath the orifice area above the heating elements 14 and above the heating element 16.

FIG. 2 shows an isometric view of a heating unit 14 according to the invention with longitudinally aligned, rod-shaped, straight heating elements 16 held on two carrier elements 18. The carrier elements 18 have an approximately column-like structure and are fastened on a bottom element 44 of the heating unit 14. A plug contact 24 is arranged underneath the bottom element 44 and is connected in an electrically conductive manner to the heating elements 16 by a cable cord 46 comprising cables 48. The cables 48 electrically connecting the plug contact 24 to the individual heating elements 16 are run in the longitudinal shafts 22 of the carrier elements 18. The cables 48 are clearly shown in FIG. 3. The deflection sheet 40 is arranged above the carrier elements 18 and deflects an air flow guided by the carrier elements 18 in a controlled manner into the environment above the heating unit 14. As FIG. 1 indicates, the bottom element 44 can form the bottom wall 34 of the heat box 12. The bottom element 44 can at least be a component of the bottom wall 34 of the hot box 12 and form a layer of the bottom area 34.

FIG. 3 shows a heating unit 14 according to the invention in an isometric view with details exposed in the drawing. For a better illustration, the wall areas of the carrier element 18 in the front drawing plane have been omitted. The upper opening 20, which frees a longitudinal shaft 22 of the carrier element 18, can be readily recognized on the rear carrier element 18 shown in the drawing plane. Receiving openings 28 are shown on the inside of the carrier element 18 into which the heating element 16 can be positively inserted. On the right side of the drawing plane, the wall area 30 of the front carrier element 18 with the recess openings 28 is shown exposed in the drawing. As is shown, the receiving openings 28 can be worked in as laterally open slide-in units in an approximately comb-like manner into the wall area 30. This facilitates the assembly of the heating element 16, which can be positively inserted in a suitable manner laterally into the receiving openings 28. The temperature profile impressed on the preforms 10 can be influenced by a suitable selection of the intervals between the superposed receiving openings 28 of the wall area 30.

The double arrow underneath the wall area 30 comprising the receiving openings 28 indicates that the wall areas 30 can be can be arranged on the heating unit 14 in a height-adjustable manner. It can be provided to this end that the wall areas 30 are supported in a longitudinally shiftable manner in the carrier elements 18. For example, the wall area 30 can be guided in a groove of the carrier elements 18.

FIGS. 4 and 5 show detailed views of the carrier element 18 with heating elements 16 held on it. It can be readily recognized that the heating elements 16 are inserted into receiving openings 28 of the carrier elements 18 which openings are open laterally, that is, transversely to the longitudinal direction. As FIG. 5 shows, the longitudinal shaft 22 of the carrier element 18, which shaft is shown open in FIG. 4, can be constructed in such a manner that it can be closed with a cover element 26.

FIG. 6 shows a heating unit 14 according to the invention with heating elements 16 constructed shaped like rods in a greatly schematized view of a side view. The heating elements 16 are arranged longitudinally aligned between two carrier elements 18, wherein the end areas of the heating elements 16 are held on the carrier elements 18. In the present case the heating unit 14 is provided with five heating elements 16.

As this variant of an embodiment shows, web-shaped radiation shields 50 can be provided which are arranged between two adjacent heating elements 16. In the present case, two radiation shields 50 are shown which are arranged between a first and a second heating element 16 and between the second and a third heating element 16. Other radiation shields 50 can be readily provided on the heating unit 14 which are arranged between other heating elements 16.

FIG. 7 schematically shows a sectional view of the heating unit 14 from FIG. 6 along the sectional line 7-7. The section is shown looking in the longitudinal direction of the rod-shaped heating elements 16. The radiation shields 50 are constructed here with a rectangular cross section and are aligned symmetrically to the stack plane of the heating elements 16. Radiation which is emitted from the rod-shaped heating elements 16 in a radial direction is shielded in areas by the radiation shields 50. As can be recognized in particular in FIG. 7, a radiation shield 50 arranged between a first heating element 16 and a second heating element 16 blocks the radiation path between these heating elements so that the adjacent heating elements 16 are not mutually heated by direct radiation.

The radiation shields 50 can have a width in the direction transverse to their longitudinal extension which is less than the diameter of an adjacent heating element 16. Even in the case of a small width, a large part of the radiation of a heating element 16 which is emitted in the direction of the adjacent heating element 16 is blocked. The width of a radiation shield 50 preferably corresponds in its transverse extension to the diameter of a heating element 16.

The radiation shields 50 preferably have low thermal absorption qualities, which prevents an excessive heating of their body. In particular, the radiation shields 50 can be constructed to be reflective for the radiation emitted by the heating elements 16. The radiation shields 50 can be constructed in particular to retain their direction and into reflect in a diffuse manner. The cross-sectional profile constructed in a rectangular manner in the present case prevents an undesired focusing of the impacting radiation so that the temperature profile to be generated on the preforms is not changed in an undesired manner by radiation reflected from the radiation screens.

FIG. 8 shows a radiation shield 50 according to the invention in cross section viewed along its longitudinal axis. As is shown in FIG. 8, the radiation shield 50 can be constructed in several layers. In the present case the radiation shield 50 comprises a first encasing layer 52 with a shielding material 54 enclosed in it. The encasing layer 52 forms the first layer and the shielding material 54 forms the second layer of the radiation shield 50.

The radiation shield 50 is preferably constructed from an encasing layer 52 consisting of quartz glass and of a shielding material 54 enclosed in it. The shielding material 54 is preferably a powder, especially a metal oxide or an oxide ceramic material. These materials have proven to be especially heat-resistant, so that long service lives of a heating unit 14 according to the invention can be achieved with this configuration.

The longitudinal shaft 22, which is open at the top and at the bottom with openings 20, produces a chimney effect when loaded with a cooling air, so that the end areas of the heating elements 16, which project while being held on the carrier elements 18 into the longitudinal shafts 22 of the carrier elements 18, are cooled. In order to produce the chimney effect, cooling air can be introduced through a cooling conduit 36, shown, e.g., in FIG. 1, below the heating unit 14 through the lower opening 20 of the carrier element 18 into the longitudinal shaft 22 and discharged at the upper opening 20 of the carrier elements 18.

FIGS. 4 and 5 clearly show that holding bodies 48 can be arranged on the end areas of the rod-shaped heating elements 16. Groove-shaped notches are preferably worked into these holding bodies 48 which notches improve a positive seat on the receiving openings 28 of the wall area 30. To this end, the heating elements 16 can be inserted with the holding bodies 48 laterally into the receiving openings 28. As can be readily recognized in the FIGS. 4 and 5, it can be provided that the groove of the holding bodies 48 is constructed as an annular groove which completely surrounds on the outside wall of the holding body 48. When carrier element 18 is closed, edge areas of the carrier elements 18 and of the cover element 26 can engage into the groove of the holding element 48 in order to prevent an exiting of cooling air from the longitudinal shaft 22 into the heat channel or into the environment of the heating elements 16.

FIG. 9-11 show in a purely schematic manner by way of example the formation of a heating stretch with heat boxes 12 in a row. The arrows show the transport direction of preforms 10. FIG. 9 shows a first variant in which the preforms 10 are guided in one row or one track through the heat channels of the heat boxes 12. As FIG. 9 shows, it can be provided that the preforms 10 can be transported in the heat boxes 12 in opposite directions past the heating units 14 present here arranged in the middle between the transport paths. FIGS. 10A and 10B show a second variant in which the preforms 10 are guided at least in areas into tracks or two rows through the heat channels of the heat boxes 12, namely in the same direction. FIGS. 10A and 10B therefore show a double row running through the heat boxes 12 in parallel transport rows in the same direction of transport. According to FIG. 10A it can be provided that the preforms 10 are transported through the heat channels offset from each other in the direction of transport. According to FIG. 10B, it can be provided in a modification that the preforms 10 are transported through the heat channels at the same level in the direction of transport.

FIG. 11 shows a modification of the heating stretch of FIG. 9, wherein the heat boxes 12 are arranged laterally bordering each other. In distinction to the variant of FIG. 9, a preform 10 does not run through the same heat box 12 upon entering into the heating stretch and upon exiting out of the heating stretch. This is especially advantageous if different temperature profiles are desired at the entry of the heating stretch and at the exit of the heating stretch. The different profiles at the entrance and at the exit of the heating stretch can be achieved here by the individualized heating power or the individual configuration of the heating elements 16 of the heating boxes at the entrance and at the end of the heating stretch. A similar advantage also results in the two-track guiding of the preforms 10 in FIGS. 10A and 10B.

LIST OF REFERENCE NUMERALS

10 preforms
12 heat box
14 heat unit
16 heating element
18 carrier element
20 hole
22 longitudinal shaft
24 plug contact
26 cover element
28 receiving openings
30 wall area with receiving openings
32 side wall heat box
34 bottom wall heat box
36 cooling conduit
40 deflection sheet
42 side cooling conduit
44 bottom element
46 cable cord
48 holding body
50 radiation shield
52 first layer of the radiation shield
54 second layer of the radiation shield

The invention claimed is:

1. A heat box for thermally conditioning preforms made of thermoplastic material for blow molding, said heat box comprising two opposing side walls and one bottom wall that together define a heating tunnel, and wherein:
   the heating tunnel comprises at least two separate heat channels that extend parallel to one another and through which the preforms are transportable in a transport direction;
   a heating unit is arranged between the at least two separate heat channels;
   the heating unit comprises a plurality of rod-shaped heating elements that extend longitudinally in the transport direction of the preforms;
   the heating unit comprises two hollow columnar carrier elements that hold the plurality of heating elements;
   each of the carrier elements is open on each end;
   the carrier elements define a shaft that functions as a conduit for a flow of fluid through the carrier elements;
   a cooling conduit is arranged underneath the heat box; and
   the cooling conduit is fluidly connected to the shafts of the carrier elements.

2. The heat box according to claim 1, wherein the heating unit further comprises at least one web-shaped radiation shield which extends longitudinally between two adjacent heating elements.

3. The heat box according to claim 1, wherein each end area of the plurality of rod-shaped heating elements is held by the carrier elements in such a manner that free ends of the heating elements extend into the shafts defined by the carrier elements.

4. The heat box according to claim 1, wherein each of the rod-shaped heating elements of a heating unit is connected in an electrically conductive manner to a common plug contact.

5. The heat box according to claim 1, wherein the heating units are modular and are individually removable from the heat box.

6. The heat box according to claim 1, wherein each of the carrier elements comprises a cover element that is removable to provide lateral access to the shaft.

7. The heat box according to claim 1, wherein end areas of the heating elements comprise holding bodies that are positively insertable into receiving openings of the carrier elements.

8. The heat box according to claim 7, wherein the receiving openings are arranged as sequential laterally open slide-in units into a wall area of the carrier elements.

9. The heat box according to claim 8, wherein the wall areas with the receiving openings are movably supported on the carrier elements to adjust a height of the heating elements relative to the heat tunnel.

10. The heat box according to claim 1, wherein said two opposing side walls of the heat box comprise elements for reflecting thermal radiation.

11. The heat box according to claim 1, further comprising transport means for transporting the preforms in a single row through the at least two separate heat channels in in opposite directions.

12. A heating device comprising a plurality of heating boxes according to claim 1, wherein said heat boxes are arranged side by side so as to form a heating section.

13. A blowing machine comprising a heat box according to claim 1.

14. A method for thermally conditioning preforms made of thermoplastic material for blow molding, comprising moving in adjacently running transport rows through a heat box according to claim 1, wherein the transport rows run through the separate heat channels of the heat box, and wherein the heating element arranged between the separate heat channels heats the thermoplastic material of the preforms guided past the heating element on both sides.

15. The method according to claim 14, wherein the preforms are transported in opposite directions through the separate heat channels of the heat box.

* * * * *